United States Patent [19]
MacDonald et al.

[11] 3,948,543
[45] Apr. 6, 1976

[54] MOTORCYCLE SUSPENSION SYSTEM

[76] Inventors: John M. MacDonald; Charles J. MacDonald, both of 1260 Bluesky Drive, Cardiff, Calif. 92007

[22] Filed: Jan. 24, 1975

[21] Appl. No.: 543,686

[52] U.S. Cl. .............................. 280/284; 267/171
[51] Int. Cl.² ........................................ B62K 25/04
[58] Field of Search ...... 280/284, 283, 275; 180/32; 267/171

[56] References Cited
UNITED STATES PATENTS

| | | | |
|---|---|---|---|
| 460,641 | 10/1891 | Jeffery | 280/275 |
| 463,710 | 11/1891 | Mathews | 280/275 |
| 624,295 | 5/1899 | Carpenter | 280/275 |
| 1,057,573 | 4/1913 | Moritz et al. | 280/286 |
| 1,317,788 | 10/1919 | Hinsdale | 267/171 |

FOREIGN PATENTS OR APPLICATIONS

| | | | |
|---|---|---|---|
| 18,229 | 1892 | United Kingdom | 280/284 |
| 454,775 | 2/1950 | Italy | 280/283 |
| 480,387 | 4/1953 | Italy | 180/32 |

*Primary Examiner*—Kenneth H. Betts
*Attorney, Agent, or Firm*—Ralph S. Branscomb

[57] ABSTRACT

The invention comprises a suspension system for a motorcycle or the like wherein the rear wheel suspension spring is connected to the frame in such a manner that upward impacts received by the rear tire are reacted on the frame in a substantially horizontal direction rather than vertically as in conventional motorcycles so that the pitching motion and vertical thrust on the rear end of the motorcycle is considerably reduced over rough terrain, a feature which is particularly advantageous in offroad racing.

5 Claims, 8 Drawing Figures

MOTORCYCLE SUSPENSION SYSTEM

BACKGROUND OF THE INVENTION

Motorcycles have been conventionally designed for use on roadways, trails and race tracks which are relatively free from bumps, ruts, and other obstacles. However, in recent years, off-road use of motorcycles has become increasingly popular, particularly in competitive events such as motocross and desert racing, and motorcycles have been designed specifically for these off road activities, incorporate many improvements over conventional roadway cycle design, including improvements in rear wheel suspension systems. However, these improvements are for the most part modifications of conventional rear suspension units which are comprised of a swinging arm or fork pivoted from the main frame and carrying the rear wheel, and a pair of shock absorbing units connected between the swinging arm and upper members of the main frame.

These suspension systems have proven quite adequate for normal roadway or graded racetrack use. When used at high speeds in rough terrain, they have proven to have many desirable characteristics needed for this use such as high lateral rigidity, low unsprung weight, maintain load on front wheel for steering in turns, and simplicity in construction and servicing. However, they have one major shortcoming in that the sudden vertical shock loads delivered to the rear wheel upon striking an obstacle are absorbed and reacted into the rear of the frame either as a direct vertical force, or a force that has a significant vertical component. This vertical reaction on the rear of the frame causes it to rise suddenly in a rotational motion about the front wheel point of contact with the ground. The result of this motion is loss of traction, and reduced control of the motorcycle, and in severe cases causes loss of rear wheel contact with the ground which may throw the cycle end-over-end into a bad crash. Such accidents are normally avoided by reducing speeds prior to encountering large obstacles when seen sufficiently in advance, but some are not foreseeable, and the desire to achieve competitive racing positions encourages maintaining high speeds when mode rate obstacles are foreseen. Therefore an improvement in rear suspensions for motorcycles used in off-road racing is definitely needed, but must be accomplished in a manner that does not diminish the desirable characteristics inherent in current designs.

SUMMARY OF THE INVENTION

The invention is an improved rear wheel suspension system primarily intended for off-road motorcycle application which reduces the above mentioned problems by permitting higher speed operation over rough terrain without sacrificing control. The system is capable of absorbing large shocks and vertical rear wheel motion and reacting these forces as torsion in the main frame with a minimum delivery of vertical force of moment coupling, so that the rotational tendency of the motorcycle upon rear wheel impact is greatly reduced.

Structurally the suspension system comprises a spring means mounted between the swing arm that carries the rear wheel and the frame such that vertical displacement of the rear wheel results in horizontal forces being reacted on a portion of the frame which is preferably well below the center of gravity of the motorcycle and rider. The spring means may be provided as a tension, compression, or torsion coil spring, or the equivalent. The suspension on system can be incorporated in traditional off-road motorcycles without reducing the advantageous elements of design such as lateral rigidity, low unsprung and overall weight and positive front wheel steering. A preliminary dynamic analysis of the invention as part of a motorcycle both confirms the theoretical reaction of vertical forces into torsion on the frame with mimimum vertical forces, and assures that the dynamic aspects of natural frequencies of the cycle compared to excitation frequencies induced by rough terrain produce a dynamically stable condition in operation. Extensive testing of the system incorporated in motorcycle of current design and operated by several different riders in off-road races has proven it to be considerably superior to conventional systems in terms of speed and control.

DETAILED DESCRIPTION OF THE PREFERRED EMBODIMENT

Figure 1:
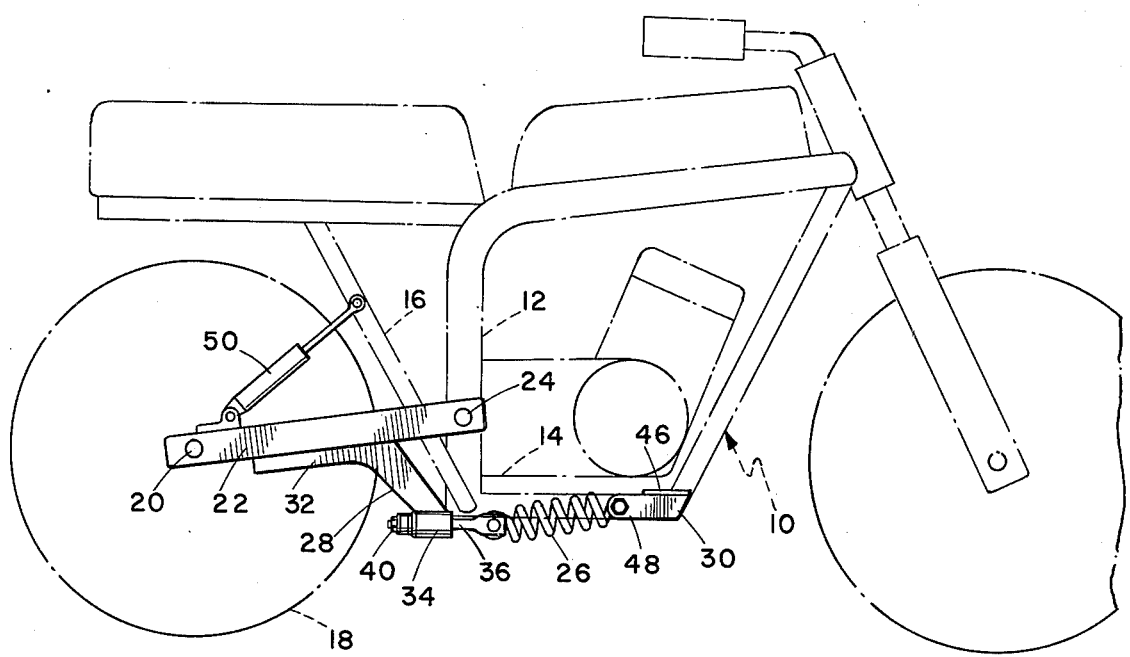
FIG. 1 is a side elevational view of a motorcycle shown in phantom with the suspension assembly installed.
Figure 2:
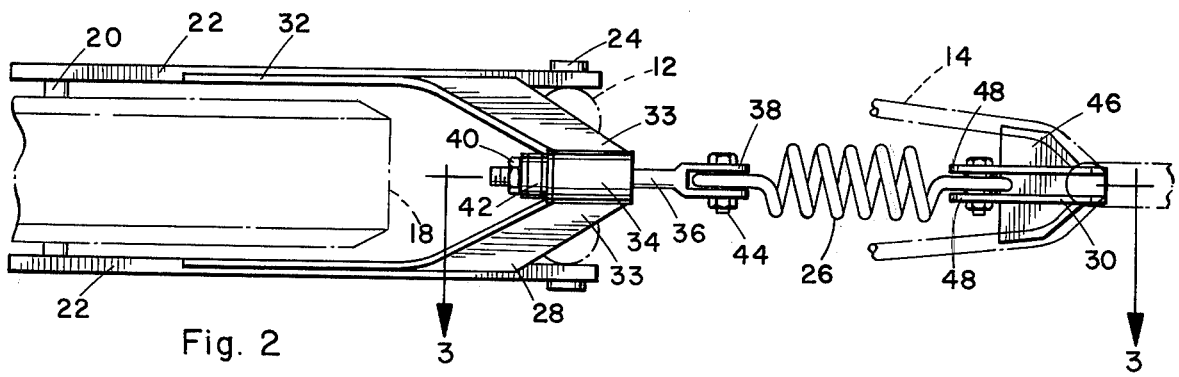
FIG. 2 is a view of the suspension assembly as seen from below.
Figure 3:
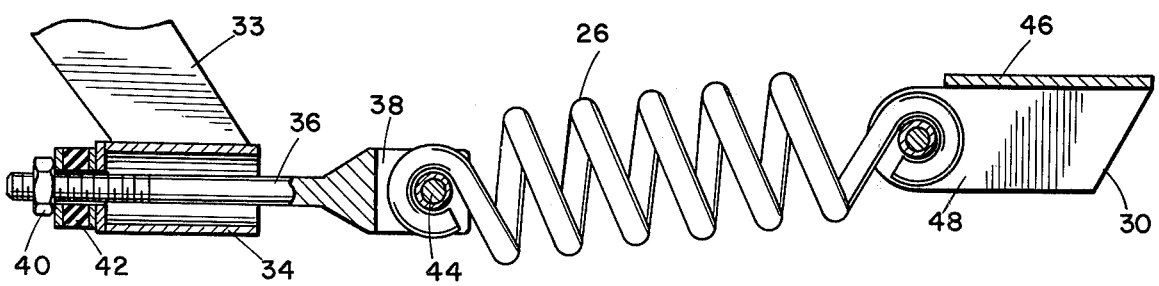
FIG. 3 is a section view taken along the lines 3—3 of FIG. 2.
Figure 4:
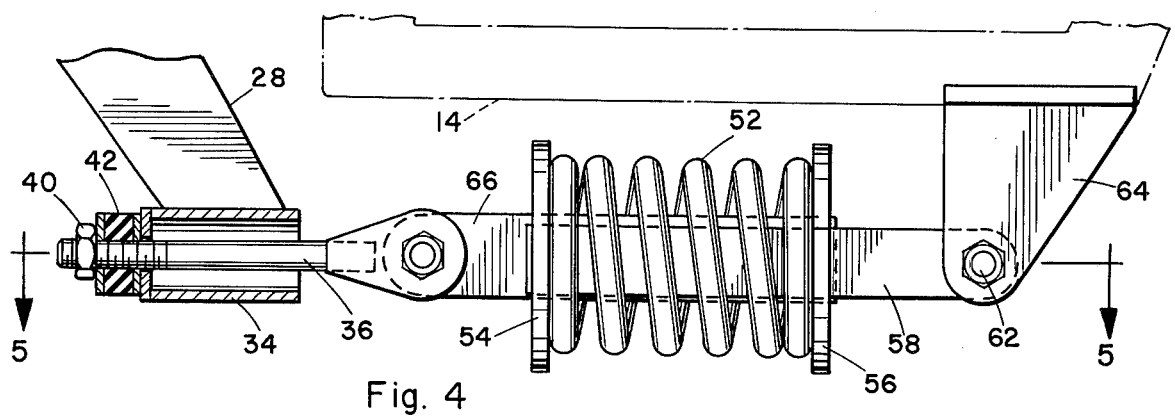
FIG. 4 is a side elevation view of a modified form of the spring arrangement.

The suspension system of the invention as incorporated in a motorcycle is best shown in FIG. 1, wherein 10 represents diagrammatically illustrated motorcycle frame having a pair of vertical support members 12. jointed at their bottoms and rigidly connected at their bottoms to a pair of longitudinal frame members 14 and two diagonal seat supports 16. The rear wheel 18 is journalled at 20 between the rear ends of a swing arm assembly 22 comprising two bars pivoted at 24 to the vertical support 12 of the main frame. The structure as thusfar described is obviously very diagrammatic and subject to extensive modification without defeating the function of the invention.

The rear wheel is carried on the swing arm assembly 22 which is ordinarily suspended beneath an upper frame member by compression springs and shock absorbers in conventional motorcycles. In the instant invention, however, direct spring linkage with an upper frame member is omitted altogether and instead a horizontally reacting spring 26 is used which is connected between an extension arm 28 depending from the spring arm assembly and a bracket 30 which is mounted to a forward portion of the supports 14.

The arm 28 may be actually constructed of two convergent side plates 33 as shown, having integral rearwardly extending fork portions which are preferably welded to the individual side members of the swing arm assembly 22. The convergent ends of the side plates merge into a boss 34 having a longitudinal bore therethrough which receives the threaded shank 36 of a clevis 38 which is secured to the extension arm by a nut 40 which may be spaced from the boss by an alignment washer 42. The nut may be tightened or loosened to vary the static tension on the spring to optimize the tension parameter for riders of different weights.

The spring 26 is retained in the clevis by clevis pin 44, and the bracket 30 to which the other end of the spring is attached comprises a horizontal plate welded to the top of the frame members 14, and two depending parallel arms 48 through which the spring is bolted. This structure is exemplary only, it being clear that the clevis could be attached to the bracket 30 and rather than the arm 28, and other engineering variations are conceivable within the scope of the invention.

The spring action should be damped by one or more shock absorbers which perhaps ideally should parallel the spring. However, practical considerations of exposure to dirt and damage in off-road conditions suggest that, as illustrated at 50, the shock absorbers should be mounted between the swing arm and upper frame members such as seat supports 16. Tests have indicated that the vertical shock forces in the undampened direction coupled to the frame by the shock absorbers, especially when they are forwardly raked as shown in FIG. 1, do not substantially interfere with the dynamic advantages provided by the improved spring means.

Figure 5:
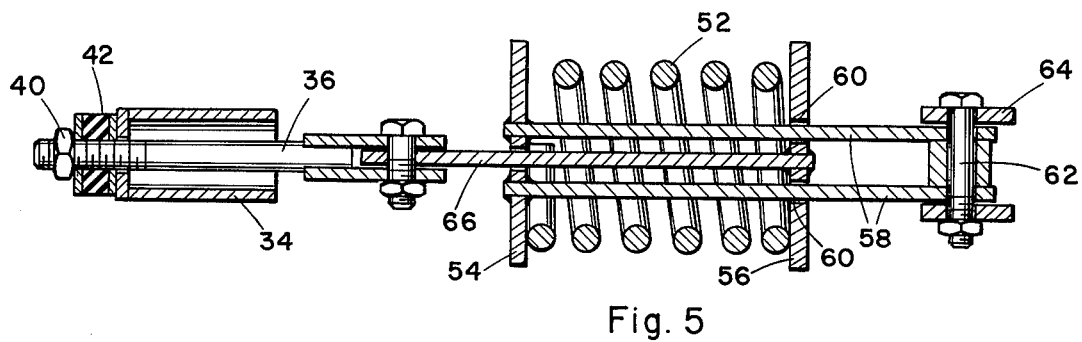
FIG. 5 is a sectional view taken on line 5—5 of FIG. 4.
Figure 6:
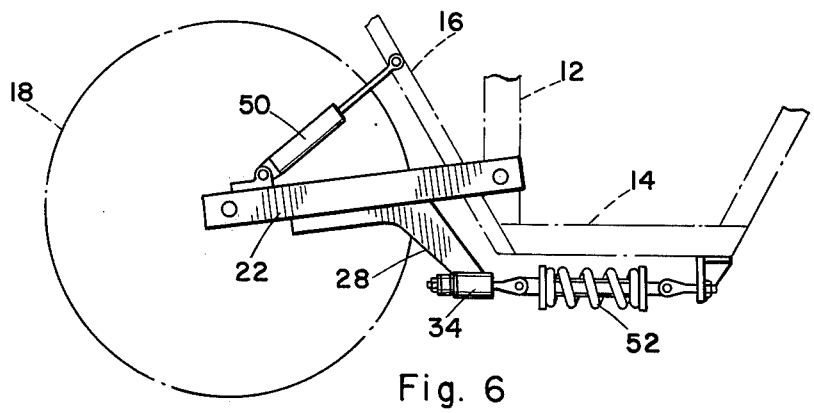
FIG. 6 is a side elevation view of an alternative spring arrangement.

In keeping with the overall requirements that the spring means used be substantially horizontally reacting and connected to the frame below the operational center of gravity, several other embodiments of the spring means is replaced by a compression spring 52 which is captured between two retaining caps 54 and 56. As best seen in FIG. 5, cap 54 has welded thereto a pair of bars 58 of which extend through the hollow core of the spring and pass through slots 60 in retaining cap 56 and are pivotally connected at 62 to an arm or bracket 64 which extends downwardly from the lower member of the frame 10. Similarly, a single bar 66 is welded to the forward cap extending through the rear cap and is pivoted to the clevis 38.

This triple bar construction is extremely durable and trouble-free in operation, and permits the utilization of a compression spring in an extension spring capacity. The compression spring is advantageous in that it may be made of lighter guage steel than an extension spring with the same spring strength, and does not require hooked ends which are prone to breakage in use. Also, the problem of pre-loading the spring is lessened, although it is still adviseable to incorporate the means of tension adjustment inherent in the clevis assembly as discussed above. The use of three bars slideable in slots in the end caps virtually eliminates any sloppiness in the spring action as well as investing the spring assembly with tremendous durability. It will be noted that the bars 58 and 66 could be modified or provided in a number other than three and the compression-extension spring action would be substantially preserved.

The angle of the spring 52 will probably decline slightly toward the rear when the motorcycle is not in use, and incline toward the rear under shock conditions. This change of attitude is accomodated by the pivotal mounting of the bars. However, throughout its length of travel, the spring will not deviate from the horizontal by more than a few degrees, so that the horizontal dissipation of shock forces will be generally effective under all conditions.

Figure 7:
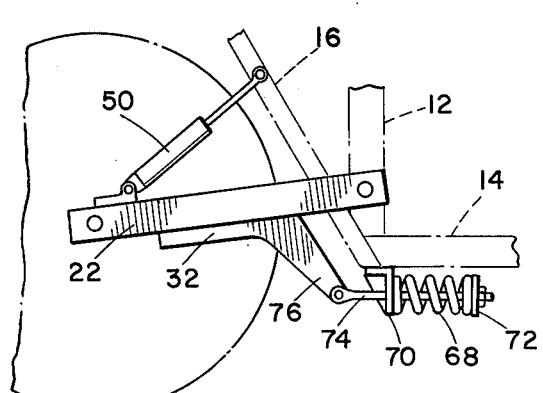
FIG. 7 is a side elevation view of another spring arrangement.
Figure 8:
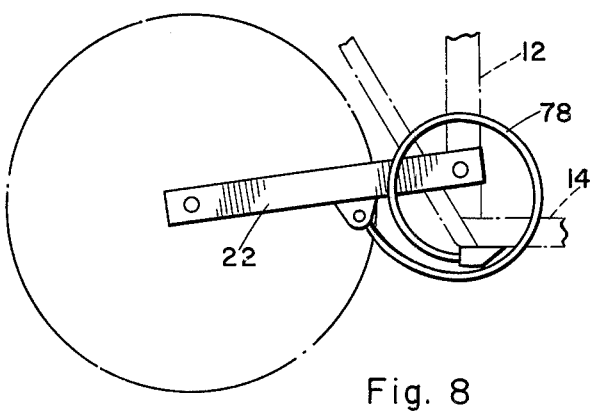
FIG. 8 is a side elevation of a further spring arrangement.

A modified form of compression-extension spring is shown in FIG. 7, in which the coil spring 68 is captured between a brace 70 and an end cap 72 which is compressed against the spring by a draw rod 74 which passes through an opening in the brace and is pivoted to a modified projection 76 mounted on the swing arm. This embodiment is somewhat simpler than the others and may be preferable on certain frame designs.

Finally, a torsion coil or leaf spring, very diagrammatically illustrated at 78 could be used. In this version, substantial horizontal reactance of vertical forces is effected and could undoubtedly be increased somewhat with further engineering development.

I claim:

1. An improved rear wheel suspension system for a motorcycle or the like having a frame, a rear wheel, a substantially horizontal longitudinally extended swing arm assembly pivoted at its forward end to the frame, and a wheel journalled to the rearwardly extended end of said swing arm assembly, said suspension system comprising:
   a. a rigid extension arm projecting down from said swing arm assembly and having a substantially horizontal longitudinal bore therethrough;
   b. a spring means having one end thereof connected to said frame and the other end thereof connected to said swing arm assembly by means of a clevis engaging said spring and having a threaded shank extending through said bore and secured by a nut on the side of said extension arm remote from said spring, such that the swing arm is adjustably downwardly biased thereby and upward force on the swing arm is reacted through said spring means as a substantially horizontal force on said frame.

2. An improved rear wheel suspension system for a motorcycle or the like having a frame, a rear wheel, a substantially horizontal longitudinally extended swing arm assembly pivoted at its forward end to the frame, and a wheel journalled to the rearwardly extended end of said swing arm assembly, said suspension system comprising:
   a. a projection extending downwardly from said swing arm;
   b. a brace extending downwardly from said frame forward of said projection;
   c. said brace having a longitudinal aperture therethrough and said projection having a pull rod pivoted to the distal end thereof and extending through said aperture, said pull rod having a retainer cap on the forward end thereof; and
   d. a compression coil spring disposed on said rod and captured between said brace and said retainer cap.

3. An improved rear wheel suspension system for a motorcycle or the like having a frame, a rear wheel, a substantially horizontal longitudinally extended swing arm assembly pivoted at its forward end to the frame, and a wheel journalled to the rearwardly extended end of said swing arm assembly, said suspension system comprising:
   a. a downwardly projecting arm extending from said swing arm assembly;
   b. a downwardly projecting arm extending from a lower portion of said frame;
   c. a substantially horizontally extended coil spring;
   d. two retainer caps capturing said coil spring therebetween;
   e. each of said projecting arms having means connecting same to the more remote one of said caps whereby compression of said spring is effected by the separation of said downwardly projecting arms.

4. Structure according to claim 3 wherein each of said caps has at least one bar connected thereto comprising said connecting means which extends longitudinally through said coil spring and through at least one opening provided in the other cap and connected to one of said downwardly projecting arms.

5. Structure according to claim 4 wherein one of said caps has two bars projecting therefrom through said coil spring and the other of said caps has one bar projecting therefrom through said coil spring and between the two bars projecting from said one cap.

* * * * *